E. G. LOOMIS.
SWING JOINT.
APPLICATION FILED FEB. 20, 1917.
1,297,370.
Patented Mar. 18, 1919.
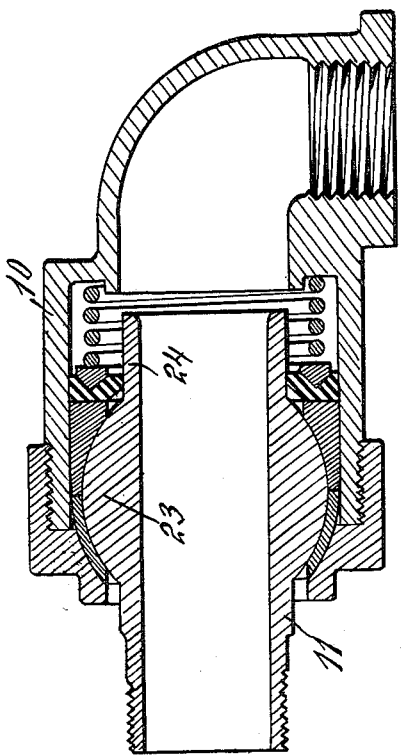
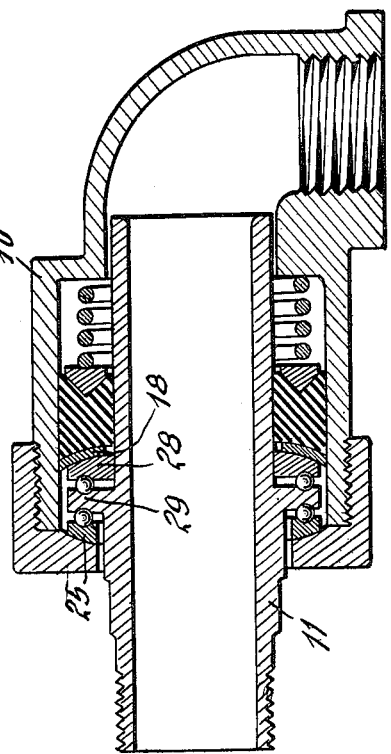
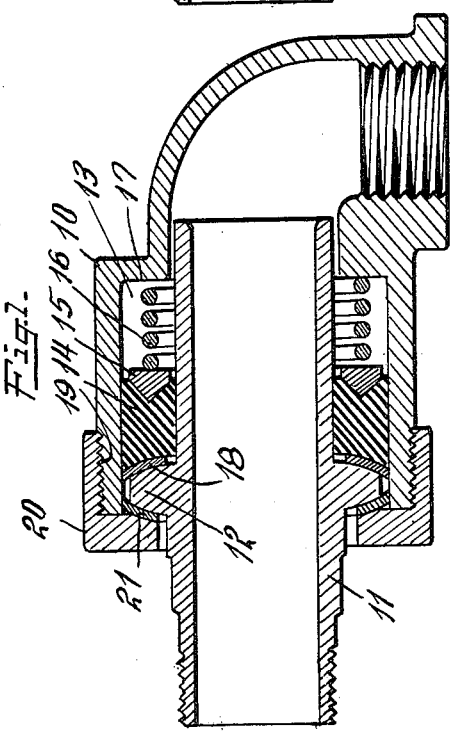
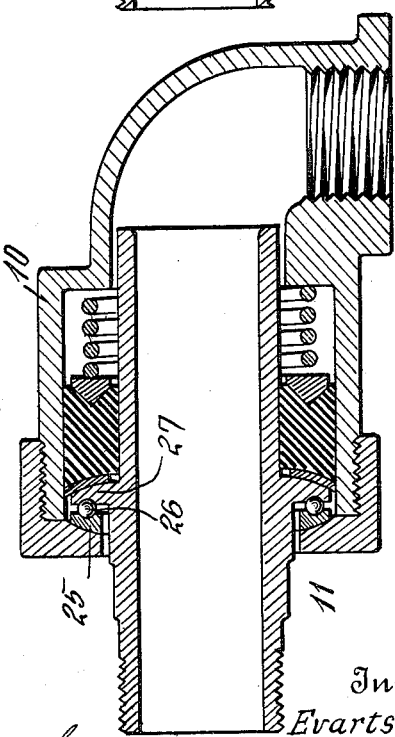
Inventor
Evarts G. Loomis.
By his Attorney
E. W. Marshall

UNITED STATES PATENT OFFICE.

EVARTS G. LOOMIS, OF NEWARK, NEW JERSEY.

SWING-JOINT.

1,297,370.     Specification of Letters Patent.     Patented Mar. 18, 1919.

Application filed February 20, 1917. Serial No. 149,841.

*To all whom it may concern:*

Be it known that I, EVARTS G. LOOMIS, a citizen of the United States of America, and a resident of Newark, county of Essex, and State of New Jersey, have invented certain new and useful Improvements in Swing-Joints, of which the following is a specification, reference being had to the accompanying drawings, forming a part thereof.

My invention relates to joints or unions for piping and has special reference to such as are known as "swing joints".

One object of my invention is to provide a joint of the aforesaid character that shall be durable, reliable in operation, and arranged to automatically take up for wear in the packing, without any relative movement between the parts which are joined.

Another object is to provide a joint which shall not only be adapted to have one of its elements turned relative to the other, but which shall also permit a limited universal movement between the two.

In order that my invention may be thoroughly understood I will now proceed to describe the same in the following specification and then point out the novel features thereof in appended claims.

Figure 1 is a longitudinal section of a pipe joint arranged and constructed in accordance with my invention, and constituting an embodiment thereof.

Figs. 2, 3 and 4 are views corresponding to Fig. 1, of modified structures which also constitute embodiments of my invention.

Special reference may first be had to Fig. 1 in which 10 designates a socket member having any suitable form, the L shown in the drawing being only one of the number of well known forms. The plug member of the joint is designated 11 and has a collar or annular projection 12.

The socket member 10 is enlarged near the mouth to receive the collar 12 and forms an annular chamber 13 in which suitable packing 14, a pressure ring 15 and a spring 16 are disposed.

The enlargement of the socket member forms a shoulder 17 and the spring 16 is coiled around the end of the plug member 11 and is held in compression between the shoulder 17 and the pressure ring 15. The arrangement of parts is such that the pressure ring is forced against the packing 14 and firmly jams the packing into the space between the plug and the socket and between the ring and collar.

The pressure ring 15 is preferably V or wedge-shaped in section so that it tends to spread the packing and force it against the inner wall of the socket and the outer wall of the plug.

A metal washer 18 is preferably inserted between the packing 14 and the collar 12.

The socket 10 is screw-threaded at 19 to receive a collar 20 which is screwed on after the plug is in place and engages the collar 12 of the plug. A metal washer 21 is preferably introduced between the collar 20 of the socket and the collar 12 of the plug to prevent cutting at the cast metal surfaces without permitting any appreciable takeup of the parts longitudinally. The arrangement of parts is such that the plug member 11 is adapted to turn about its center line as an axis in the annular bearing which is provided by the metal washers 18 and 21.

The wear in the packing 14 is automatically taken up by the spring 16 which continuously presses the ring 15 against it. Attention is directed to the fact that the collar or flange 20 of the socket and the collar or enlargement 12 of the plug have coöperating surfaces which permit the turning and in fact a limited universal movement of each member of the joint relative to the other. Nevertheless the members are held in a fixed longitudinal position independently of the wear in the packing 14 which is taken up by the pressure ring 15.

My invention is particularly concerned with swing joints and the universal movement permitted between the parts is limited to a small angle by the engagement of the inner end of the plug with the walls of the passage into which it is loosely fitted. The universal movement is also limited by the packing which surrounds the inner extension of the plug and must be compressed to accommodate any universal movement. However, sufficient freedom is permitted to avoid leakage due to poor alinement of the connected pipes, or like causes, which have hitherto rendered swing joints unreliable.

The structure of Fig. 2 is similar to that of Fig. 1, except that the plug member 11 is provided with an annular projection 23 which has a circularly curved section. Furthermore, the end 24 of the plug member is made shorter so as to permit a less restricted universal movement of the plug member relative to the socket member.

The structure of Fig. 1 may be modified as shown in Fig. 3 by substituting a ring 25 for the washer 21 and interposing bearing balls 26 between the ring 25 which constitutes a ball race and the adjacent surface of the collar 27. This collar corresponds to the collar 12 of Fig. 1 but is modified in section to constitute a ball race to coöperate with the ring 25.

By this means the joined members are able to turn relative to each other more readily. The turning friction may be still further reduced by means of the arrangement shown in Fig. 4, in which a ring 28 is interposed between the collar 29 of the plug and the washer 18. The rings 25 and 28 each constitutes a ball race and both surfaces of the collar 39 are formed to provide coöperating ball races. Attention is particularly directed to the fact that the structures of Figs. 1, 3 and 4 are not universal joints in the ordinary sense of the word and are not intended to be used with a universal adjustment between the parts. They are intended to be used where a rotative adjustment of one of the parts relative to the other is required but they are arranged to permit a very limited universal action and by this means tendency for leakage when the joints are in operation is eliminated. The ball bearings may of course be employed with a collar or projection having the form shown in Fig. 2, if desired, and in fact various structural modifications may be effected within the spirit and scope of my invention. I therefore intend only such limitations as are imposed by the appended claims.

What I claim is:

1. A non-universal swing joint comprising a socket member having a fluid passage enlarged into an inner socket at one end, and a removable collar having an inwardly extending flange provided with a spherically curved interior lateral surface of large radius, a plug member extending through the enlargement and fitted loosely into said inner socket to hold the parts of the joint substantially in alinement but permitting a slight lateral movement of the plug member, an annular projection on the plug member having a spherically curved lateral outer surface opposed to the spherically curved surface of the collar flange, packing around the extension of the plug within the socket, tending to hold the parts of the joint in alinement, a spring pressing the packing against the annular projection of the plug member and pressing said opposed spherically curved surfaces toward each other, and a metal washer between the opposed spherically curved surfaces to prevent cutting without permitting material longitudinal movement of the parts.

2. A non-universal swing joint comprising a socket member having a fluid passage enlarged into an inner socket at one end, and a removable collar having an inwardly extending flange provided with a spherically curved interior lateral surface of large radius, a plug member extending through the enlargement and fitted loosely into said inner socket to hold the parts of the joint substantially in alinement but permitting a slight lateral movement of the plug member, an annular projection on the plug member annularly divided into rings at least one of which is divided into a spherically curved outer lateral surface opposed to the spherically curved surface of the collar flange, bearing balls between the rings, packing around the plug projection within the socket tending to hold the parts of the joint in alinement, and a spring pressing the packing against the annular spring of the plug member and pressing the opposed spherically curved surfaces toward each other.

In witness whereof, I have hereunto set my hand this 13th day of February, 1917.

EVARTS G. LOOMIS.

Witness:
H. M. MAYHEW.